United States Patent [19]

Soehngen et al.

[11] 4,290,987

[45] Sep. 22, 1981

[54] PROCESS FOR PREPARING MICROPOROUS HOLLOW FIBERS

[75] Inventors: John W. Soehngen, Berkeley Heights; John C. Chen, Westfield, both of N.J.

[73] Assignee: Celanese Corporation, New York, N.Y.

[21] Appl. No.: 54,050

[22] Filed: Jul. 2, 1979

[51] Int. Cl.³ ................... B29D 27/00; D01D 5/24
[52] U.S. Cl. ..................... 264/41; 264/209.5; 264/210.4; 264/210.8; 264/235; 264/288.8; 428/376
[58] Field of Search ............ 264/209, 235, 177 F, 264/41, 210.3, 210.4, 210.8, 288.8; 428/376

[56] References Cited

U.S. PATENT DOCUMENTS

| | | | |
|---|---|---|---|
| 3,078,544 | 2/1963 | Shealy | 204/159.15 |
| 3,088,794 | 5/1963 | Bonner | 204/343 |
| 3,117,173 | 1/1964 | Adams | 204/288.8 |
| 3,155,754 | 11/1964 | Adams | 204/343 |
| 3,215,486 | 11/1965 | Hada et al. | 204/210.3 |
| 3,513,110 | 5/1970 | Noether | 204/210.3 |
| 3,630,824 | 12/1971 | Ro | 204/210.7 |
| 3,637,906 | 1/1972 | Parathoen | 204/210.7 |
| 3,822,333 | 7/1974 | Haruta et al. | 204/343 |
| 3,839,516 | 10/1974 | Williams et al. | 204/210.7 |
| 3,957,936 | 5/1976 | Lauchenauer | 204/343 |
| 4,001,367 | 1/1977 | Guthrie et al. | 264/210.4 |
| 4,020,230 | 4/1977 | Mahoney et al. | 264/210.4 |
| 4,096,227 | 6/1978 | Gore | 264/127 |

*Primary Examiner*—Jay H. Woo
*Attorney, Agent, or Firm*—Kenneth A. Genoni

[57] ABSTRACT

The present invention provides a process for preparing microporous hollow fibers by solvent stretching a nonporous hollow precursor fiber having a controlled degree of molecular orientation as measured by birefringence. Control of the precursor fiber orientation yields a microporous hollow fiber having an improved balance of mechanical strength and permeability.

5 Claims, No Drawings

PROCESS FOR PREPARING MICROPOROUS HOLLOW FIBERS

BACKGROUND OF THE INVENTION

Mircoporous hollow fibers are well known in the art as are the advantages which can be derived therefrom. For example, microporous hollow fibers possess a larger surface area per unit volume than a flat film of similar porous configuration when employed in a separatory device. Consequently, they are capable of minimizing priming requirements of devices employing the same which are used for filtration, and a variety of other purposes. A low priming requirement is especially significant in the separation of human blood into plasma and its cellular components commonly referred to as blood plasmapheresis since regulations require that no more than about 500 ml of whole blood can be outside the body at any given time during a plasmapheresis procedure.

Centrifugation techniques are currently utilized for most plasmaphertic applications. However, these techniques are conducted on a batch basis and have several drawbacks related to processing time, cost effectiveness and safety.

Consequently, the use of membrane filtration technology for the continuous flow plasmapheresis as an alternative to existing centrifugal techniques is the subject of an ongoing investigation.

It has been observed that when blood flows in narrow channels, such as a hollow fiber, red blood cells tend to migrate toward the axis of the path, leaving a "cell poor" layer at the periphery. If the wall of the channel is permeable (e.g., a microporous membrane), plasma can be collected without affecting the cells. In such a system, two forces act on the blood cells. The first is a "drag force" that tends to draw the cells to the filtering wall, while the second is a "repulsive force" that moves the cells toward the axis of the channel. If the repulsive force, which is a function of the shear rate of the system, is higher than the drag force, contact of the cells with the filtering surface is minimized and plasma can be rapidly collected.

In order for a microporous hollow fiber to be suitable for use in plasmapheresis applications the pore size, pore density, thickness, and structure of the fiber must be controlled to achieve filtration of only the blood plasma at an acceptable filtration rate. This requires that the hollow fiber have a pore size which is large enough to pass the plasma protein molecules through the fiber wall and yet small enough to prevent passage of the blood cells therethrough. In addition, the mechanical properties of the microporous hollow fiber must be sufficient to prevent rupture of the fiber wall at the transmembrane pressure differential employed during the procedure.

In addition to plasmapheresis procedures, there are a number of other separations which are necessary in certain industrial operations where hollow fiber membranes of the type contemplated by this invention may also be advantageously employed. In all such applications, the process economics are highly dependent upon the transport rate of various components across the fiber wall and the ability of the fiber wall to discriminate various components. That is, an efficient hollow fiber membrane must not only have a high permeability or transport rate but also possess a high degree of selectivity. The difficiencies of the hollow fibers of the prior art center primarily on the inability to achieve an acceptable balance of mechanical properties, selectivity, and permeability.

For example, cellulosic and polycarbonate membranes generally possess poor mechanical properties and rupture relatively easily.

There is a wide variety of techniques known for imparting a porous structure to polymeric fibers or films. For example, U.S. Pat. No. 3,839,516 is directed to a process for preparing a microporous film by a solvent stretching technique which relies on the same general principles as that of the subject invention for developing a microporous structure in a hollow fiber. However, this patent is directed to films and not hollow fibers. Consequently, there is no recognition that the degree of orientation of the precursor hollow fiber which is rendered microporous in the present invention must be controlled to render them processable on a continuous basis and to control and improve the permeability thereof. Improvements in the solvent stretch film process of U.S. Pat. No. 3,839,516 may be found in U.S. Patent Application Ser. No. 44,801 filed June 1, 1979 and U.S. Patent Application Ser. No. 44,805 filed June 1, 1979. These applications also fail to suggest the importance in providing a precursor hollow fiber with a specified degree of orientation.

U.S. Pat. No. 4,055,702 discloses a process wherein interconnecting microvoids are imparted to a solid fiber and the microvoids are impregnated with various additives. This is achieved by cold drawing an undrawn or partially drawn melt spun fiber formed from a polyester, polyamide, propylene, or high density polyethylene in the presence of a non-solvent swelling liquid or vapor drawing medium to achieve a localized reduction in the diameter of the fiber. The temperature of the drawing medium, however, must be below the effective glass transition temperature of the fiber. Moreover, drawing media which swell the undrawn fiber for more than about 2% of the dry volume are not considered as suitable. This patent also fails to recognize the importance of molecular orientation of the precursor fiber.

U.S. Pat. No. 3,325,342 discloses a process wherein a non-crystalline, unoriented as-spun polyamide solid fiber yarn is treated in an aqueous swelling agent to develop crystallinity and then drawn to crystallize the yarn. The drawn yarn exhibits a lower density than the undrawn yarn due to the presence of microscopic voids produced by the swelling agent during the crystallization step. It is not stated whether such microvoids are interconnecting which is essential in the present invention. Moreover, the as-spun fiber which is drawn is unoriented and non-crystalline both of which conditions are unacceptable in the present invention.

None of the above described patents is directed toward preparing an open-celled, microporous, hollow fiber in accordance with the procedures of the present invention.

It is therefore an object of the present invention to provide a process for preparing microporous, open-celled hollow fibers on both a batch, and particularly on a continuous basis which exhibit an improved balance of selectivity, permeability, mechanical strength properties and processability.

It is another object of the present invention to provide microporous, open-celled hollow fibers which have utility as separatory membranes.

It is a further object of the present invention to provide microporous open-celled hollow fibers which have particular utility in plasmapheresis applications.

These and other objects and features of the invention will become apparent from the claims and from the following description.

SUMMARY OF THE INVENTION

In one aspect of the present invention there is provided a process for preparing open-celled microporous hollow fibers which comprises:

(a) providing a non-porous hollow precursor fiber from a polymer selected from the group consisting of polyolefins, polyacetals, polyamides, polyesters, polyalkylene sulfides and polyarylene oxides said polymer having both an amorphous component and a crystalline component with a degree of molecular orientation characterized by a birefringence of from about 0.0005 to about 0.010;

(b) contacting said hollow precursor fibers with a swelling agent, said swelling agent comprising a non-aqueous solvent having a Hildebrand solubility parameter at or near that of the polymeric hollow precursor fibers, for a time sufficient to permit absorption of the swelling agent into the hollow fibers;

(c) stretching said hollow precursor fibers while in contact with the swelling agent, which is at a temperature greater than the glass transition temperature of the precursor fiber and the freezing point of the swelling agent and less than the temperature at which the precursor fiber dissolves, at a degree of stretch of from about 150 to about 400% based on the initial precursor fiber length and a strain rate of from about 5 to about 150%/min.; and (d) removing the swelling agent from said film while maintaining said hollow fibers in the stretched state.

In another aspect of the present invention the above described process is conducted on a continuous basis.

DESCRIPTION OF THE PREFERRED EMBODIMENTS

The present invention provides a process for preparing microporous hollow fibers which exhibit an improved balance between mechanical properties and liquid and gas permeabilities. The process described herein provides a nonporous hollow precursor fiber having a specifically defined orientation which is then subjected to a number of processing conditions which are controlled to impart the desired porous configuration to the hollow precursor fiber. By controlling the precursor fiber orientation, the balance of mechanical strength, and permeability can be controlled and the microporous hollow fibers can be prepared on a continuous basis.

It is to be understood in characterizing the microporous hollow fibers of the present invention that porous or cellular fiber structures can be classified into two general types: one type in which the pores are not interconnected, i.e., a closed-cell structure, and the other type in which the pores are essentially interconnected through more or less tortuous paths which may extend from one exterior surface or surface region to another, i.e., an open-celled structure. The porous hollow fibers of the present invention are of the latter type.

The broad general requirement of the polymers used to prepare the hollow precursor fiber employed in the process described herein is that they must have at least two components one of which has a greater affinity for the chosen swelling agent than the other components. Preferably crystalline materials which have both an amorphous component and a crystalline component are employed. It is the amorphous component which is mobilized by the swelling agent to allow separation between the crystal lamella. Accordingly, polymers which exhibit a percent crystallinity of at least 30 percent, preferably at least 40 percent, and most preferably at least 50 percent, e.g., about 50 to about 90 percent, are suitable since by nature they possess two components.

Percent crystallinity is determined by the X-ray method described by R. G. Quynn et al in the Journal of Applied Polymer Science, Vol. 2, No. 5, pp. 166–173 (1959). For a detailed discussion of crystallinity and its significance in polymers, see Polymers and Resins, Golding (D. Van Nostrand, 1959).

Other bicomponent or multicomponent hollow precursor fibers which may be used include melt-blends of two or more polymers, at least one of which but not the major amount of the blend, is preferentially swollen by the chosen swelling agent. Examples of such melt-blends include blends of two or more of the following polymers: polyethylene, polypropylene, polyacrylonitrile, polystyrene, polyamides, polyesters, and polyacetals, to name a few. Block copolymers are also useful in the process of this invention. With such copolymers the chosen swelling agent must preferentially swell at least one, but not the major amount, of the kinds of blocks in the copolymer. Examples of such block copolymers are: polystyrene-poly-2-vinyl-pyridine, polystyrene-polyacrylonitrile, polymethacrylate-polyvinylpyridine, and polypropylene-polymethacrylate, to name a few.

A significant group of crystalline polymers, i.e., synthetic resinous materials, to which the process of the present invention may be applied are the olefin polymers, e.g., polyethylene, polypropylene, poly-3-methyl butene-1, poly-4-methyl pentene-1, as well as copolymers of propylene, 3-methyl butene-1, 4-methyl pentene-1, or ethylene with each other or with minor amounts of other olefins, e.g., copolymers of propylene and ethylene, copolymers of a major amount of 3-methyl butene-1 and a minor amount of a straight chain n-alkene such as n-octene-1, n-hexadecene-1, n-octadecene-1, or other relatively long chain alkenes, as well as copolymers of 3-methyl pentene-1 and any of the same n-alkenes mentioned previously in connection with 3-methyl butene-1. These polymers in the form of precursor hollow fibers should generally have a percent crystallinity of at least 30 percent, preferably at least 40 percent, and most preferably about 50 to about 90 percent, or higher.

For example, when polyethylene is used, a linear polymer typically having a weight average molecular weight between 50,000 and 800,000 preferably between 50,000 and 500,000 can be employed. When propylene homopolymers are contemplated, an isotatic polypropylene having a percent crystallinity as indicated above, a weight average molecular weight ranging from about 50,000 to 750,000 preferably about 200,000 to 500,000 and a melt index from about 0.1 to about 75, can be employed.

The preferred polymers employed to prepare the precursor hollow fiber are selected from the above described group of olefin polymers based on their possession of a number of different polymer properties which include molecular weight distribution ratio ($\overline{M}_w/\overline{M}_n$), melt index (ASTM D-1238), density (e.g., the polymer should be a homopolymer) and crystallization time.

More specifically, olefin polymers (i.e., those polymers prepared by polymerization of olefin monomers through their unsaturation) such as polyethylene having a high melt index, i.e., not less than about 3 and typically from about 3 to about 20, preferably from about 3 to about 15, and most preferably about 3 to about 8 are preferred to prepare the hollow precursor fibers of the present invention. The term melt index as used herein is defined as the value obtained by performing ASTM D-1238 under conditions of temperature, applied load, timing intervals and other operative variables which are specified therein for the particular polymer tested. The lower limit of the melt index, i.e., about 3, can be reduced further to about 0.3 by employing nucleating agents which compensate for the effect of employing lower melt indices below about 3 and for the tendency of certain polymers to form large spherulites.

Suitable nucleating agents should be non-reactive with the polymer resin at processing conditions and have high surface area, small particle size and be capable of being dispersed in the polymer matrix. Moreover, such agents should not be agglomerated for maximum effect to be achieved.

Representative examples of suitable nucleating agents include silica, diatomaceous earth, titanium dioxide, clays, salts of mono and di carboxylic acids, colloidal polytetrafluoroethylene, i.e., polytetrafluoroethylene having a colloidal particle size of about 0.5 to 1.0 micron and capable of being dispersed in the colloidal state, and mixtures thereof.

The nucleating agent may also be a polyethylene resin having a low melt index of from about 0.1 to about 3, typically from about 0.4 to about 1, and a narrow molecular weight distribution ratio of from about 1 to about 3.5. Such a polymer would have a large proportion of molecular weight fractions in the range of about 150,000 to about 200,000. Consequently, these high molecular weight fractions would be the first to solidify upon cooling and are believed to provide nucleation sites for the formation of small spherulites. Since a polyethylene nucleating agent is employed in small amounts it results in an overall balance of polymer blend properties which are beneficial to the hollow microporous fiber structure of the present invention.

The nucleating agents may be present in the polymer in an amount which typically will vary from about 0.01 to about 10%, preferably from about 0.01 to about 1.0%, and most preferably from about 0.01 to about 0.5% by weight based on the weight of the polymer.

The nucleating agents are incorporated and dispersed within the polymer resin by conventional means such as blending them with resin pellets and subsequently melt extruding the mixture under high shear conditions.

Alternatively, the polymer may be dissolved in a suitable solvent and the nucleating agent dispersed in the solution. The polymer and nucleating agent are then co-precipitated by flashing off the solvent or by the addition of a non-solvent. The co-precipitate would then be filtered and dried.

The preferred olefin polymers also have a broad molecular weight distribution ratio ($\overline{M}_w/\overline{M}_n$) of not less than about 3.8, typically from about 3.8 to about 13 and preferably from about 6 to about 12 (e.g., about 8 to about 12).

The molecular weight distribution ratio of a polymer is determined by dividing the weight average molecular weight ($\overline{M}_w$) by the number average molecular weight ($\overline{M}_n$) of a given sample.

$\overline{M}_w$ can be determined by gel permeation chromotography using o-dichlorobenzene at 145° C. which is further discussed in J. F. Johnson and B. S. Porter, eds., "Analytical Gel Permeation Chromotography", Wiley-Interscience, N.Y. (1968). $\overline{M}_n$ can be determined by end group analysis as described in 9 Encyclopedia of Polymer Science and Technology 184, Interscience Publishers (1967). Both of the above references are herein incorporated by reference.

Similarly, it is preferred to employ olefin homopolymers having as high a density as technically possible rather than co-polymers in preparing the precursor hollow fiber since the use of homopolymers of increasingly higher density improves the morphological structure of the microporous hollow fibers prepared therefrom. When polyethylene is employed as the polymer used to prepare the precursor hollow fiber the density thereof should not be less than about 0.960 gm/cc, and most preferably from about 0.962 to about 0.965 gm/cc. These density ranges are indicative of polyethylene homopolymers. The term density as used herein is defined as the value in gm/cc obtained by performing ASTM D-1505 on a particular polymer.

The preferred olefin polymers will preferably also exhibit a crystallization time above certain limits. The crystallization time is determined by heating the polymer to a temperature of above the melting point (e.g., 200° C. for polyethylene) and held at that temperature for one minute. The polymer is then allowed to cool to a predetermined temperature (i.e., 120° C. for polyethylene) and held at this temperature while the time it takes for crystallization to occur is determined by differential scanning calorimetry (DSC). In the DSC analysis a plot is made of the heat evolved during crystallization as a function of time. The time it takes for the DSC curve to peak is taken as the crystallization time.

Polymers having increasingly lower crystallization times will generally yield precursor hollow fibers which exhibit increasingly higher permeability potentials. Crystallization times for polyethylene to reach the DSC peak at a temperature of 120° C. should be less than about 70 seconds and preferably from about 10 to 40 seconds.

The presence of gels in the polymer employed to prepare the precursor fiber is preferably avoided by melt filtration.

This is achieved by passing the resin employed to form the precursor fibers, while molten, from an extruder through a suitable filter such as a screen pack changer (e.g., 200×1200 mesh) or Dynalloy ™ X-6 or X-7 filter (rated 15 and 20 microns respectively). Dynalloy ™ X-6 and X-7 are grades of depth type filter media fabricated of sintered metal fibers manufactured by Fluid Dynamics, Inc., of Cedar Knolls, N.J. The filter media is mounted in a suitable filter holder device and positioned at the exit end of a melt extruder and before the spinneret. For continuous operation the filter media is changed periodically by switching the melt flow through an alternate standby filter while changing the depleted filter.

The average gel count of the resin after filtration is determined by extruding a 3 mil thick flat film using the filtered resin and counting the number of gels in a 90 sq. inch film area by visual examination.

The resin is melt filtered until it exhibits a low average gel count of not greater than about 2.0, and preferably from about 0 to about 1.0 per 90 sq. inch surface area of an extruded 3 mil film sample.

It should be understood that olefin polymers, particularly polyethylene, which possess one or more of the above described properties outside the ranges described herein, can be employed in the process of the present invention. However, a penalty is paid in terms of a decreasingly lower permeability of the microporous hollow fiber as any particular property increasingly deviates from the preferred polymer property ranges.

The most preferred resins, however, will comprise high melt index, high density, quickly crystallizing homopolymers having a broad molecular weight distribution ratio.

The most preferred homopolymer for use in the process of the present invention is polyethylene having the properties described herein.

While the present disclosure and examples are directed primarily to the aforesaid olefin polymers, the invention also contemplates the high molecular weight acetal, e.g., oxymethylene, polymers. While both acetal homopolymers and copolymers are contemplated, the preferred acetal polymer is a "random" oxymethylene copolymer, i.e., one which contains recurring oxymethylene, i.e., —CH$_2$—O—, units interspersed with —OR— groups in the main polymer chain where R is a divalent radical containing at least two carbon atoms directly linked to each other and positioned in the chain between the two valences, with any substituents on said R radical being inert, that is, which do not include interfering functional groups and which will not induce undesirable reactions, and wherein a major amount of the —OR— units exist as single units attached to oxymethylene groups on each side. Examples of preferred polymers include copolymers of trioxane and cyclic ethers containing at least two adjacent carbon atoms such as the copolymers disclosed in U.S. Pat. No. 3,027,352 of Walling et al. These polymers in fiber form may also have a crystallinity of at least 30 percent, preferably at least 40 percent, and most preferably at least 50 percent, e.g., 50 to 60 percent, or higher. Further, these polymers have a melting point of at least 150° C. and a number average molecular weight of at least 10,000. For a more detailed discussion of acetal and oxymethylene polymers, see, Formaldehyde, Walker, pp. 175–191, (Reinhold, 1964).

Other relatively crystalline polymers to which the invention may be applied are the polyalkylene sulfides such as polymethylene sulfide and polyethylene sulfide, the polyarylene oxides such as polyphenylene oxide, the polyamides such as polyhexamethylene adipamide (nylon 66) and polycaprolactam (nylon 6), and polyesters such as polyethylene terephthalate, polypropylene terephthalate, polybutylene terephthalate, all of which are well known in the art and need not be described further herein for sake of brevity.

The appropriate polymer is converted to a hollow precursor fiber by any technique known in the art capable of imparting the desired degree of orientation and suitable for the particular polymer chosen for imparting a hollow fiber configuration. Such methods include wet spinning, dry jet wet spinning, dry spinning, and melt spinning. The preferred method is melt spinning. In a melt spinning technique the molten polymer is caused to flow through one or more orifices (i.e., jets) of a spinneret which is capable of imparting the desired continuous hollow configuration to the fiber. For instance, in the preferred embodiment the melt is caused to flow through one or more annular dies having a hollow needle extending into each central portion thereof. A gaseous or liquid stream is then passed through the needle as the melt is pumped through the annular die thereby imparting a hollow configuration to the fiber.

The spinning conditions at which the non-porous precursor hollow fiber are prepared, such as jet diameter, extrusion temperature, air flow rate, take up speed, cooling rate and drawdown ratio are controlled, in part, in a manner sufficient to impart a specific degree of molecular orientation to the hollow precursor fiber.

The degree of precursor fiber molecular orientation is characterized in terms of birefringence which is determined in accordance with the procedures outlined in U.S. Pat. No. 3,681,188 the disclosure of which is herein incorporated by reference.

Thus, the birefringence of the precursor hollow fibers is controlled to be typically from about 0.0005 to about 0.010, preferably from about 0.0008 to about 0.005, and most preferably from about 0.001 to about 0.003.

The particular birefringence imparted to the hollow precursor fibers is selected, in association with the solvent stretching conditions, to control the processability of the precursor fibers and the permeability of the resulting hollow microporous fibers.

At increasingly higher birefringences of the precursor fiber, e.g., greater than about 0.01, the liquid and gas permeability of the resulting solvent stretched hollow microporous fibers will be increasingly reduced for any given set of solvent stretching conditions. At increasingly lower birefringences of the precursor fiber, e.g., less than about 0.0005, the mechanical properties of the precursor fiber will be increasingly reduced to the extent that it will lose its capability of being solvent stretched under continuous processing conditions.

The process conditions of drawdown ratio, take-up speed and cooling rate are directly proportional to precursor fiber molecular orientation while jet diameter and extrusion temperature are inversely proportional to such orientation.

In view of the above, the temperature at which the polymer is extruded, i.e., melt spun (assuming other spin variables as described herein are employed) is generally no higher than about 150° C. above the melting point of the polymer and no lower than about 10° C. above the melting point of the polymer. For polyethylene such temperatures may vary from about 170° to about 270° C., preferably about 180° to about 250° C.

The melt spinning or melt extrusion step of the process is conducted at a relatively high "drawdown" or "spin draw" ratio. The drawdown ratio employed is a significant contributing factor to the degree of orientation imparted to the precursor hollow fiber. Drawdown ratio is defined as the ratio of the velocity of initial take-up speed of the hollow fibers to the linear velocity of extrusion of the polymer through the spinneret orifice. The drawdown ratio used in the process of the present invention when preparing precursor fibers from an olefin polymer such as polyethylene is typically from about 20 to about 200, preferably from about 25 to about 150 and most preferably from about 30 to about 100. Take-up speeds employed to accomplish the requisite drawdown ratios are generally at least about 20 meters/minute, typically from about 30 to about 200 meters/minute and preferably from about 50 to 150 meters/minute. Typically moderate shear forces are developed in the polymeric material which are not relaxed prior to fiber solidification.

More specifically, the amount of residual shear forces determines the orientation or birefringence of the precursor fiber. Such shear forces are influenced primarily by the melt temperature, drawdown ratio and cooling rate. Consequently, it is possible for a precursor fiber to exhibit lower birefringence at higher drawdown ratios and extrusion temperatures than would be obtained by employing lower extrusion temperatures and similarly high drawdown ratios. Take-up speed by itself does not determine drawdown ratio since such ratios are also dependent upon extrusion rates. However, take-up speed will influence birefringence because it also affects the cooling rates of the precursor fiber.

The air flow rate, i.e., the rate at which the air is passed through the needle in the central portion of the jet hole will vary depending on the number of jet holes in the spinneret and is typically controlled to be from about 0.05 to about 10 cc/min/jethole, and preferably from about 0.5 to about 5 cc/min/jethole.

The temperature of the air as it exits the air injection spinneret is typically about the same temperature as the melt spinning temperature of the polymer.

The melt spun hollow fibers are preferably slowly cooled in order to minimize stress and any associated orientation which might result from a fast quench to obtain maximum crystallinity but yet fast enough to avoid developing large spherulites. This may be accomplished by controlling the distance of the chill roll take-up from the spinneret to be from about 1 to about 20 meters, preferably from about 2 to about 10 meters. Optionally, the fibers may be passed through a water quench bath maintained at a temperature of about 20° to about 30° C. (e.g., 25° to 30° C.). The quench bath is preferably located about 5 to about 10 inches from the spinneret face.

While the above processing parameters are controlled with a view toward achieving a precursor fiber molecular orientation within a limited range they are also controlled to impart the desired precursor hollow fiber dimensions of inner and outer diameters as well as inner diameter to wall thickness ratio. The precursor hollow fiber dimensions controls the dimensions of the microporous hollow fibers which result from the solvent stretching process.

The particular dimensions imparted to the precursor hollow fibers will generally be determined by the use for which the resulting microporous hollow fibers are intended. Thus, the average inner diameter (I.D.) of the hollow precursor fiber can vary from as low as 25 microns to as high as 500 microns. The solvent stretching process generally results in a 20–40% decrease in the inner diameter of the precursor fiber while the fiber wall thickness of the resulting microporous hollow fiber does not change substantially from that of the precursor hollow fiber. When the microporous hollow fibers are intended to be used to achieve separation and purification of blood plasma the average inner diameter is typically controlled to be from about 200 to about 400 microns.

The minimum wall thickness of the hollow precursor fibers should be sufficient so as to not be readily ruptured or otherwise undergo physical deterioration at a rate that would make their use unattractive after they have been rendered microporous by the procedures described herein. The maximum wall thickness of the hollow fibers is limited by the degree of permeability sought to be imparted to the final product.

The measurement of average wall thickness is accomplished by determining the average outer diameter and average inner diameter of the fiber and taking as the wall thickness one-half of the difference in these average diameters.

Furthermore, the average wall thickness may be expressed as a function of the average inner diameter of the hollow fiber. The ratio of the average inner diameter of the hollow precursor fiber to its average wall thickness will typically vary from about 1:1 to about 10:1, preferably from about 2:1 to about 8:1 and most preferably from about 3:1 to about 6:1 respectively.

The hollow precursor fibers having the appropriate degree of orientation are then rendered microporous by subjecting them to a solvent stretching operation.

Optionally, the hollow precursor fibers may first be initially heat treated or annealed prior to contact with the swelling agent in order to improve crystal structure, e.g., by increasing the size of the crystallites and removing imperfections therein. Annealing of the hollow precursor fiber permits it to respond to given solvent stretch conditions in a shorter period of time than would otherwise be obtained in the absence of annealing and consequently permits the use of higher strain rates during stretching.

Generally, this annealing is carried out at a temperature in the range of about 5° C. to 50° C. below the melting point of the polymer for a period of a few seconds to several hours, e.g., 5 seconds to 24 hours, and preferably from about 30 seconds to about 2 hours.

Suitable annealing temperatures for polyethylene when performed in-line, i.e., on a continuous basis, can vary from about 90° to about 120° C., and preferably from about 110° to about 120° C., for a period of time of which can vary from about 1 to about 30 minutes, and preferably from about 2 to about 10 minutes (e.g., 5 minutes). Batch annealing of a large roll of precursor hollow fiber (e.g., about 5000 meters) will require longer periods, e.g., about 24 to 96 hours, at temperatures of from about 80° to about 90° C. to achieve similar results.

It is appropriate to mention that annealing duration and annealing temperature are generally interchangeable to a certain degree in the sense that the annealing temperature may be increased if the exposure thereto is decreased appropriately.

The annealing step may be conducted in a tensioned or controlled length state by depositing the precursor fiber in a static condition in a heating zone which is maintained at the requisite elevated temperature, or by continuously passing the precursor fiber through the heating zone. For example, the elevated temperature may be accomplished by the use of a conventional circulating air oven, infra-red heating, dielectric heating, or by direct contact of the running fiber with a heated surface which is preferably curved to promote good contact. The precursor fiber may be continuously passed through a jacketed tube or shroud which radiates heat at the desired temperature. Alternatively, the precursor fiber may be wound under substantially no stress on a bobbin while undergoing annealing, or simply placed in the heating zone in a loose state, such as a skein of continuous fibers. For best results it is recommended that the hollow fiber be maintained at constant length during the annealing step, i.e., under conditions sufficient to prevent a longitudinal extension or shrinkage of greater than about 5%. This can be achieved by passing the fibers in the direction of their length over and about a first stress isolation device through a heating zone maintained at the appropriate temperature and then over and about a second stress isolation device. Each stress isolation device may conveniently take the form of a pair of skewed rolls. Control of the ratio of the surface speeds of the two sets of rolls permits isolation and control of the stress of the fibers between the rolls as they undergo annealing.

The hollow precursor fiber, which can be optionally and preferably annealed, is then contacted with a swelling agent (i.e., pre-soaked), preferably immersed therein, for a time sufficient to permit absorption of the swelling agent into the hollow fiber walls thereby causing the fiber walls to swell; and stretched while still in contact with the swelling agent. The swelling agent is removed preferably by evaporation, while maintaining the hollow fiber under tension, and preferably at the same extension in the stretched state.

The swelling agent should be such that it preferentially swells at least one of the minor components of the bicomponent or multicomponent hollow precursor fiber. The diffusion or absorption of the swelling agent into the precursor fiber is preferably achieved by soaking the precursor fiber in the swelling agent (prior to stretching) at about the intended solvent stretch temperature for a period of about 10 seconds to about 10 minutes, and preferably for about 15 seconds to about 3 minutes, at/ substantially constant length (i.e., not greater than about 5% shrinkage or extension based on the original precursor fiber length).

For most polymers solvent stretching can be conducted by contact with any one of a number of suitable solvents.

Generally, a solvent having a Hildebrand solubility parameter at or near that of the polymer would have a solubility suitable for the drawing process described herein. The Hildebrand solubility parameter measures the cohesive energy density. Thus, the underlying principle relies on the fact that a solvent with a similar cohesive energy density as a polymer would have a high affinity for that polymer and would be adequate for this process.

It is preferred that the swelling agents be a compound composed of carbon, hydrogen, oxygen, nitrogen, halogen, sulfur and contain up to about 20 carbon atoms, preferably up to about 10 carbon atoms.

General classes of swelling agents from which one appropriate for the particular hollow precursor fiber may be chosen are lower aliphatic alcohols such as ethanol, etc.; lower aliphatic ketones such as acetone, methyl ethylketone, cyclohexanone; lower aliphatic acid esters such as ethyl formate, butyl acetate, etc.; halogenated hydrocarbons such as carbon tetrachloride, trichloroethylene, perchloroethylene, chlorobenzene, etc.; hydrocarbons such as heptane, cyclohexane, benzene, xylene, tetraline, decaline, etc.; nitrogen-containing organic compounds such as pyridine, formamide, dimethylformamide, etc.; ethers such as methyl ether, ethyl ether, dioxane, etc. A mixture of two or more of these organic solvents may also be used.

The preferred swelling agents for polyethylene include perchloroethylene (BP 127° C.) and trichloroethylene (BP 86° C.).

The degree of stretch in the presence of a swelling agent should not exceed about 400% and can vary from about 150 to about 400% (e.g., 150 to 300%), and preferably from about 200 to about 325% (e.g., from about 200 to about 300%) based on the original linear precursor fiber length.

The strain rate, i.e., the percentage of stretch per unit time in the presence of the swelling agent at which the hollow precursor fibers are stretched depends in part on the total degree of stretch. Thus, when a degree of stretch of from about 150 to about 400% is employed in solvent stretching the precursor fiber, suitable strain rates can vary from about 5 to about 150%/minute, preferably from about 10 to about 50%/minute, and most preferably from about 10 to about 30%/minute. Strain rates can be increased by annealing the precursor fiber as described herein. At the preferred degree of stretch of about 200 to about 300% the strain rate can vary from about 10 to about 30%/minute.

In a preferred embodiment solvent stretching is conducted in multiple stages wherein the total degree of stretch described herein is achieved in incremental steps in the presence of the swelling agent.

The temperature of the swelling agent during solvent stretching (i.e., solvent stretch temperature) is dependent primarily on the boiling point of particular swelling agents, the degree of stretch and the strain rate employed. As the temperature of the swelling agent is increased, however, the precursor fiber becomes increasingly more swollen and the polymer chains begin to separate. If the solvent stretch temperature is raised too high (e.g., greater than about 95° C. for perchloroethylene) the polymer will swell to such an extent that the precursor fiber will split when stretched. If the temperature employed during solvent stretching is too low (as for example, below the glass transition temperature of the polymer), the permeability of the resulting microporous fibers is substantially reduced. Accordingly, the temperature during solvent stretch is controlled for each solvent in conjunction with the other process parameters disclosed herein to avoid extensive swelling and to achieve a microporous hollow fiber exhibiting good liquid and gas permeability.

Thus, the solvent stretch temperature can vary widely from above the glass transition temperature of the precursor fiber (as determined by thermomechanical analysis) and the freezing point of the swelling agent to below the temperature at which the precursor fiber dissolves and will typically vary from about 25° to about 95° C. and most preferably from about 85° to about 90° C.

When perchloroethylene is employed as the swelling agent, the degree of stretch employed is from about 150 to about 300% (e.g., 300%), and the strain rate is from about 5 to about 150%/minute (e.g., 15%/minute), the temperature during solvent stretching can vary from about 80 to about 95° C., and preferably from about 90° to 95° C. (e.g., 90° C.). When trichloroethylene is employed as the swelling agent under similar conditions the temperature will typically vary from about 25° to about 80° C. (e.g., 70° C.).

The solvent stretched fibers are also preferably post-soaked at substantially constant length after stretching for about 1 to about 5 (e.g., 2) minutes in the selected stretching solvent at about the solvent stretching temperature.

The stretching of the precursor fibers may be performed in any convenient manner using known techniques. For example, the hollow fibers can be stretched on a conventional draw frame located in a bath of the swelling agent controlled at the appropriate solvent stretch temperature. Alternatively the fibers may be stretched in a continuous fashion by means of a stress isolation device similar to that described in connection with the annealing step.

Accordingly, precursor fibers may be wound several times about a first pair of skewed rolls, passed through a bath of the swelling agent and wound several times about a second pair of skewed rolls. This arrangement permits isolation and control of the longitudinal stress of the fibers between the two pairs of rolls during solvent stretching. The differential ratio of the surface speed of the second pair of rolls to the surface speed of the first pair of rolls determines the stretch ratio and strain rate which are adjusted accordingly.

When the microporous hollow fibers are intended for use in certain procedures such as plasmapheresis, they must be non-toxic. Thus, for certain potentially toxic swelling agents it is preferred to wash the fibers with a non-toxic liquid such as ethyl alcohol and then subject them to a vacuum heat treatment to assure that all the original swelling agent has been removed. Alternatively, it may be preferable to employ swelling agents such as acetone, ethyl alcohol and the like.

After the microporous hollow fibers have been solvent stretched and optionally post-soaked they are preferably annealed, i.e., heat set, at a temperature of from about 25° C. up to less than the fusion temperature, typically from about 80° to about 130° C., and preferably from about 85° to about 120° C., to stabilize the microporous structure of the fibers against shrinkage at room temperature over a long period of time or when subjected to elevated temperatures.

The heat-setting is carried out while the fibers are being held under tension, such that they are not free to shrink or can shrink in either direction to only a controlled extent not greater than about 15 percent, but not so great a tension as to stretch the fibers more than an additional 15 percent. Preferably, the tension is such that substantially no shrinkage or stretching occurs, e.g., not greater than about 5 percent change in stretched length in either direction.

The duration of heat-setting which is carried out after the solvent stretching operation can vary from about 5 to about 180 seconds at the higher annealing temperatures and, in general, may be within the range of about 0.1 second to about 1 hour (about 5 seconds to about 1 hour) and preferably about 1 to 30 minutes.

Heat-setting can be achieved in an atmosphere heated to the prescribed temperature. Satisfactory performance can be had in hot-air circulating ovens located at the after-end of the solvent stretching zone. The ovens can be provided with differential speed rollers in order for the fibers to be maintained under longitudinal tension, while being advanced at speeds designed to provide proper residence of the fibers within the annealing ovens.

For certain uses it may be desired to render the normally hydrophobic microporous hollow fibers of the present invention hydrophilic. This can be achieved by any means known to those skilled in the art such as by the impregnation of the pores of the fibers with a suitable surfactant such as polyvinylpyrrolidone (P.V.P) and high molecular-weight, non-ionic surfactants available under the trade name Pluronics ™ from Wyandotte Chemicals Corp. which are prepared by condensing ethylene oxide with a hydrophobic base formed by the condensation of propylene oxide with propylene glycol. Other surfactants include the series of non-ionic surface-active agents available under the trade name Tween ™ which are polyoxyalkylene derivatives of hexitol anhydride partial long chain fatty acid esters. Alternately, the fibers may be treated with sulfuric acid, chlorosulfonic acid or other such agents to render the fibers hydrophilic. The particular choice of surfactant will be influenced by the end use of the hollow fibers. When the hollow fibers are intended for plasmapheresis applications the surfactant should be non-toxic.

The pores of the microporous hollow fibers are essentially interconnected through tortuous paths which may extend from one exterior surface or surface region to another, i.e., open-celled. This term "open-celled structure" signifies that the major portion of the void or pore space within the geometric confines of the walls of the hollow fiber is accessible to the surfaces of the fiber walls.

Further, the porous hollow fibers of the present invention are microscopic, i.e., the details of their pore configuration or arrangement are described only by microscopic examination. In fact, the open cells or pores in the fibers are smaller than those which can be measured using an ordinary light microscope, because the wavelength of visible light, which is about 5,000 Angstroms (an Angstrom is one ten-billionth of a meter), is longer than the longest planar or surface dimension of the open-cell or pore. The microporous hollow fibers of the present invention may be identified, however, by using electron microscopy techniques which are capable of resolving details of pore structure below 5,000 Angstroms.

The microporous hollow fibers prepared in accordance with the present invention have an average pore size of 2,000 to 10,000 Angstroms, and more usually 4,000 to 8000 Angstroms. These values are determined by mercury porosimetry, as described in an article by R. G. Quynn, on pages 21–34 of Textile Research Journal, January, 1963. Alternatively, an electron micrograph of the fibers can be taken and pore length and width measurements are obtained by using an image analyzer or ruler to directly measure the length and width of the pores thereof, usually at 5,000 to 12,000 magnification and scaling down to appropriate size. Generally, the pore length values obtainable by electron microscopy are approximately equal to the pore size values obtained by mercury porosimetry.

The microporous hollow fibers of the present invention are also characterized by a reduced bulk density, sometimes referred to simply as a "low" density. The bulk density is also a measure of the increase in porosity of the fibers. That is, these microporous hollow fibers have a bulk or overall density lower than the bulk density of corresponding precursor hollow fibers composed of identical polymeric material, but having no open-celled or other voidy structure. The term "bulk density" as used herein means the weight per unit of gross or geometric volume of the fiber, where gross volume is determined by immersing a known weight of the fiber in a vessel partly filled with mercury at 25° C. and atmospheric pressure. The volumetric rise in the level of mercury is a direct measure of the gross volume. This method is known as the mercury volumenometer method, and is described in Encyclopedia of Chemical Technology, Vol. 4, page 892 (Interscience, 1949).

Thus, the microporous hollow fibers have a bulk density no greater than 60%, and preferably about 20 to about 50% of the precursor fibers. Stated another way, the bulk density has been reduced by at least 40% and preferably about 50 to about 80%. The bulk density is also a measure of porosity in that, where the bulk density is about 20 to 50% of the precursor fiber, the porosity has been increased to 50 to 80 because of the pores or holes.

The final crystallinity of the microporous hollow fibers is preferably at least 50%, more preferably at least 60% and more suitably about 65 to 90%.

The microporous hollow fibers described herein will exhibit a surface area of at least 15 m²/gm and preferably from about 20 to about 60 m²/gm.

Surface area may be determined from nitrogen or krypton gas adsorption isotherms using a method and apparatus described in U.S. Pat. No. 3,262,319. The surface area obtained by this method is usually expressed as square meters per gram.

In order to facilitate comparison of various materials, this value can be multiplied by the bulk density of the material in grams per cc. resulting in a surface area quantity expressed as square meters per cc.

The porosity of the solvent stretched microporous hollow fibers of the present invention may be defined as a percent ratio of the total volume occupied by the void space of a standard sample of microporous hollow fiber to the bulk volume of the same sample which is the sum of the void space volume and the volume occupied by the solid material of the fiber itself. The % porosity is determined by calculating the bulk volume of a microporous fiber sample and then determining the density of the fiber from its weight and the calculated bulk volume. The density of the polymer resin used to prepare the hollow fiber is then determined. The % porosity is then calculated from the equation:

$$\% \text{ Porosity} = \left(1 - \frac{\text{density of fiber sample}}{\text{density of resin}}\right) \times 100$$

The porosity of the microporous hollow fibers prepared in accordance with the present invention may vary from about 40 to about 80%, preferably from about 50 to about 80%, and most preferably from about 60 to about 80%.

The hollow microporous fibers also have a breaking elongation (ASTM D123-70) of not less than about 20% and preferably not less than about 50%.

The tensile strength (ASTM D 123-70) of the microporous hollow fibers is typically greater than about 1500 psi, preferably greater than about 2000 psi, and most preferably greater than about 2500 psi.

The gas permeability of the microporous hollow fibers of the present invention is determined by the Gurley test, i.e., according to ASTM D 726. This test is conducted by assembling the microporous hollow fibers in a test module which is adapted to fit a Gurley densometer. One end of the hollow fiber module is sealed off so that all of the air displaced from the Gurley instrument passes through the pores of the hollow fibers. The fibers are subjected to a standard differential pressure of 12.2 inches of water. The time in seconds required to pass 10 cm³ of air through the hollow fibers is expressed in seconds. This time value is then adjusted, using the transfer area i.e., internal hollow fiber surface area of the hollow fiber assembly, to convert the time value to second/in² of transfer area. The resulting adjusted time values are referred to as Gurley seconds. Thus, a Gurley value, as reported herein, is the time in seconds it takes to pass 10 cm³ of air through 1 in² of hollow fiber internal surface area at a pressure of 12.2 inches of water.

The Gurley of the microporous hollow fibers of the present invention can be controlled to be less than about 50 seconds, preferably less than about 20 seconds, and most preferably less than about 10 seconds.

The selectivity of the microporous hollow fibers of the present invention has been measured in terms of its permeability to dextrans (dissolved in aqueous solutions) of varying molecular weights. Dextrans are polymers of glucose which have chain like structures, and molecular weights which vary considerably. Dextrans, which are known blood plasma substitutes, are used herein to judge the ability of the hollow microporous fibers to pass or filter high molecular weight molecules through the pores of the fiber walls. The property of the microporous hollow fibers which describes its permeability to dextran is referred to herein as the clearance characteristic. The clearance characteristic is measured by determining the % clearance of 0.10%, by weight, aqueous solutions of dextran, types T10, T40, T70, T250, T500 and T2000 which differ in their molecular weight characteristics as shown at Table 2 in Example 1. The % clearance is determined as described in Example 1. The % clearance for each dextran type solution is then averaged to determine the clearance characteristic.

Accordingly, the microporous hollow fibers of the present invention are capable of exhibiting clearance characteristics typically greater than about 80%, preferably greater than about 90%, and most preferably greater than about 95%.

The microporous hollow fibers of the present invention achieve a good balance in mechanical and permeability properties. This renders them suitable for a number of different applications.

As described herein the microporous hollow fibers of the present invention may be used in plasmapheresis procedures. The separation of blood cells from suspending fluids has several important applications. In the blood services community, the collection of source plasma and the removal of cryoprotective agents from blood cells maintained in frozen storage are examples of such applications. Therapeutic applications, involving plasma removal from patients followed by either purification by perfusion over specific sorbents or exchange with appropriate physiologic solutions, have been successful in the treatment of a variety of diseases including Goodpasture's Syndrome, hyperviscosity, fulminating immune-complex crescentic nephritis, hepatic encephalopathy, some forms of cancer, xenograft rejection and lupus.

To employ the microporous hollow fibers for plasmaphersis any filtration device adapted to function with hollow microporous fibers can be employed. For example, a desired number of hollow fibers can be prearranged in a parallel bundle configuration and an adhesive is applied to each end of the bundle. The bundled fibers are then preferably inserted into an elongated fluid-tight tubular casing assembly formed of a suitable material such as steel or plastic. Each end of the bundled fibers communicates to the outside of the casing while at either end of the casing a means for sealing each end of the fiber bundle to the ends of the casing is provided. Thus, blood can be pumped through the lumen of the hollow fibers. The tubular casing is further provided with valves which open into the interior of the casing and to the outer surface of each of the fibers. The blood from a donor can be continually passed through the lumen of the hollow fibers at a suitable flow rate and inlet pressure and the plasma collected and removed from the tubular casing. The blood cells can either be returned to the donor in a continuous process or collected and used as desired.

Rather than utilizing a dual-ended tubular casing in which both ends are open to allow the passage of blood, it is possible to utilize a device in which hollow fiber bundle has been formed into a loop so that the ends of each of the fibers both exit through the same opening in the tubular casing.

In addition to plasmapheresis, the microporous hollow fibers can be employed in a variety of other applications, such as the separation of cheese proteins from cheese whey, blood oxygenation, ultrafiltration, dialysis and the like. The pore size of the hollow fibers can be controlled to accommodate the requirement of each particular end use.

The invention is additionally illustrated in connection with the following Examples which are to be considered as illustrative of the present invention. It should be understood, however, that the invention is not limited to the specific details of the Examples. All parts and percentages in the claims and the remainder of the specification are by weight unless otherwise specified.

EXAMPLE 1

Polyethylene having a melt index of 6, a weight average molecular weight of 79,000, a molecular weight distribution ratio of about 6.0, a gel count of 2 as defined herein, and a density of 0.962 gm/cc, is melt spun through a five-hole concentric hollow jet spinneret. Each jet hole of the spinneret is of the standard tube-in-orifice type with the tube supplied with a source of low pressure air, the pressure being controlled with an air flow metering device set at a flow rate of 3.0 cm$^3$/min. The outer diameter of each extrusion orifice (jet hole) of the spinneret is 1.39 mm, and the inner diameter of each extrusion orifice is 0.76 mm. The diameter of the air tube within each extrusion orifice is 0.32 mm. Pellets of the polyethylene are placed in a Modern Plastics Machinery (MPM) 1 inch extruder (24:1) and fed into the feed zone of the extruder by gravity. The extruder is provided with a metering pump to control the melt pressure of the spinneret assembly to provide a throughput through the spinneret assembly of 22.2 gms/minute. The temperatures of the feed zone, metering and melt zones of the extruder are controlled by separate jacket sections. The temperature of the spinneret assembly is controlled by a separate electrically heated jacket and a constant extrusion, i.e., spin temperature of 250° C. is maintained as indicated by a thermocouple in the spinneret assembly. An adjustable feed take-up device collects the extruded fibers, after they have passed through a water bath maintained at a temperature between 25°–30° C. and located 7 inches from the spinneret face, at a take-up speed (TUS) of 140 meters/minute. The hollow precursor fibers are accordingly drawn at a drawdown or spin ratio of 32.3. The take-up roll is located 25 feet from the spinneret. The degree of orientation of the precursor hollow fibers is determined by birefringence analysis as described herein and the results shown at Table 2, run 1. The resulting fibers are then annealed at constant length while still wrapped around the take-up roll by placing the take-up roll in an oven and heating them to 100° C. for 120 minutes. Several other sets of fibers are prepared in a similar manner under processing conditions summarized at Table I, runs 2 to 4 and their birefringences shown at Table 2.

Samples of annealed precursor hollow fibers obtained from each run are subsequently clamped between the jaws of a movable Bruckner stretch frame and immersed (pre-soaked) in perchloroethylene maintained at the solvent stretch temperature to swell the fibers. Pre-soak times are shown at Table 1. The samples are then stretched while immersed in a bath of perchloroethylene at the appropriate degree of stretch and strain rate as shown at Table 2, runs 1 to 4. The temperature of the perchloroethylene immersion bath (i.e., solvent stretch temperature) is maintained as shown at Table 1. After solvent stretching the fibers are post-soaked at constant length in perchloroethylene at the solvent stretch temperature for 1 minute as shown at Table 2. The perchloroethylene is then removed by evaporation while the fibers are allowed to dry in air at room temperature in the stretched state. The fibers are then heat set at constant length at 110° C. for 3 minutes in a circulating hot air oven. The average inner diameter (I.D.), outer diameter (O.D.), wall thickness, and pore size of each set of fibers is summarized at Table 2 for each run.

Each set of fibers is then tested to determine their % clearance for dextran solutions in the following manner.

The microporous hollow fibers of each run are prearranged in a parallel fiber bundle configuration. The number and length of fibers employed in each fiber module for each run is shown at Table 2. The open ends of each end of each fiber bundle are then inserted through two different short length (1 inch) hard plastic tubings each having a 1/16 inch inner diameter. Both ends of the fibers are then coated with epoxy resin 1 to 2 inches from the open fiber ends. Each plastic tubing is then slipped down over the resin coated section of each end of the fiber bundle so that about ½ inch of the uncoated fiber bundle protrudes out of each tubing leaving the open ends of the fiber bundle extending out of the tubing. When the resin has hardened the open ends of the fiber bundle are trimmed flush with each section of plastic tubing. Each end of each of the tubing-fiber assembly is then placed in a ⅛ inch diameter Swagelok ™ adapter and tightened to obtain a fluid tight seal leaving a ⅛ inch extension of each section of tubing exposed above the adapters. Each epoxy potted fiber assembly is then looped and inserted into a separate beaker. Each fiber assembly is primed with ethyl alcohol and then washed with triple distilled water for 0.5 hour. The water permeability of each fiber assembly is then determined by pumping triple distilled water at a pressure shown at Table 4 and the flow rate through the fiber wall over the collection time as shown at Table 4 is determined. The inlet end of each tubing-fiber assembly is then connected to a source of feed stock solution and the other end serves as an outlet for the same.

Each feed stock solution contains a dextran of different molecular weight characteristics as shown at Table 3. Dextran is a known blood plasma substitute and expander. The concentration of the dextran in each solution is also shown at Table 3. Each feed stock solution is passed through the fiber assembly for periods (i.e., collection times) varying from 1 to 4 hours, and at an inlet pressure as shown at Table 4. The permeate is collected in the beaker. The fibers are purged with water before each stock solution. The flow rate (i.e., permeate flow) of each stock solution through the fiber wall is shown at Table 4. The concentration of the dextran in the collected permeate is then determined by spectrophotometric analysis and the % clearance for each solution is determined as shown at Table 4.

The Gurley value of each fiber assembly is also determined as described herein at a pressure of 12.2 inches of water and the results shown at Table 4.

As may be seen from the data of Table 4 the hollow microporous fibers exhibit a good % clearance for dextrans having a variety of molecular weights. Such a high clearance indicates that the microporous hollow fibers are permeable to high molecular weight molecules which are in the molecular weight range of blood plasma proteins.

Also, comparing runs 1 to 3, which are prepared at the same solvent stretching conditions, it can be seen that as the birefringence decreases the permeability per micron of fiber wall thickness improves while the mechanical properties decrease.

TABLE 1

| Run No. | Air Flow Rate (cm³/min/ mole) | Extrusion Rate (gms/ min) | Extrusion Temp. (°C.) | Take-up Speed (m/min) | Draw-down Ratio | Pre-soak (min) |
|---|---|---|---|---|---|---|
| 1 | 3.0 | 22.2 | 250 | 140 | 32.3 | 1 |
| 2 | 3.0 | 22.2 | 250 | 140 | 32.3 | 1 |
| 3 | 0.5 | 11.0 | 220 | 11.8 | 5.5 | 1 |
| 4 | 0.5 | 11.0 | 220 | 11.8 | 5.5 | 5 |

TABLE 2

| Run No. | Average Precursor Fiber Birefringence | Degree of Solvent Stretch (%) | Strain Rate (%/min) | Solvent Stretch Temp. (°C.) | Swelling Agent | Post-Soak (min) | Heat Set Temp. (°C.) | Heat Set Time (Sec) | Average Microporous Fiber O.D. (μ) | Average Microporous Fiber I.D. (μ) | Average Microporous Fiber Wall Thick. (μ) | Pore Size (μ) | Fiber Bundle Length cm. | No. of Fibers in Module |
|---|---|---|---|---|---|---|---|---|---|---|---|---|---|---|
| 1 | .00125 | 200 | 13.3 | 90 | Perchloroethylene | 1 | 110 | 180 | 196 | 119 | 39 | 0.48 × 0.11 | 14.5 | 20 |
| 2 | .00125 | 200 | 25.0 | 90 | Perchloroethylene | 1 | 110 | 180 | 204 | 128 | 38 | 0.38 × 0.10 | 14.5 | 20 |
| 3 | .00028 | 200 | 13.3 | 90 | Perchloroethylene | 1 | 110 | 180 | 504 | 240 | 132 | 2.9 × 0.6 | 11.2 | 9 |
| 4 | .00028 | 250 | 16.7 | 90 | Perchloroethylene | 1 | 110 | 300 | 506 | 229 | 139 | 3.0 × 1.0 | 12.5 | 9 |

TABLE 3

Dextran Stock Solutions

| Dextran Type | Dextran Properties $\overline{M}_w$[1] | $\overline{M}_n$[2] | Feed Stock Dextran Solution Conc.[3] (%) |
|---|---|---|---|
| T 10 | 9,900 | 5,200 | 0.10% |
| T 40 | 41,000 | 28,000 | 0.10 |
| T 70 | 64,400 | 41,000 | 0.10 |
| T 250 | 236,000 | 109,000 | 0.10 |
| T 500 | 517,000 | 303,000 | 0.10 |
| T 2000 | 2,000,000 | N/A | 0.10 |

[1] $\overline{M}_w$ = weight average molecular weight.
[2] $\overline{M}_n$ = number average molecular weight.
[3] % by weight, based on the weight of the feed stock solution.
N/A = not available.

TABLE 4

| Run No. | Test Type | Stock Solution Type Water | T 40 | T 70 | T 250 | T 500 | T 2000 | Gurley (Sec) | Gurley Sec. per Micron of Fiber Wall Thickness | Tensile Strength (psi) | Elongation (%) |
|---|---|---|---|---|---|---|---|---|---|---|---|
| 1 | Permeate Flow (ml/cm² . min)* | .056 | .089 | .084 | .009 | .032 | .032 | 38.5 | .98 | 4030 | 160 |
|   | Inlet Pressure (mm Hg) | 200 | 170 | 150 | 200 | 260 | 200 | | | | |
|   | % Clearance** | N/A | 96 | 96 | 90 | 90 | 87 | | | | |
|   | Test Sequence | T 500, T 250, T 70, T 40, H₂O, T 2000 | | | | | | | | | |
|   | Collection Time (hours) | 1 | 1 | ½ | 2 | 1 | 1 | | | | |
| 2 | Permeate Flow (ml/cm² . min)* | .021 | .020 | .065 | .035 | .022 | .010 | 96.4 | 2.5 | 4120 | 220 |
|   | Inlet Pressure (mm Hg) | 200 | 200 | 200 | 200 | 200 | 200 | | | | |
|   | % Clearance** | N/A | 100 | 92 | 91 | 93 | 74 | | | | |
|   | Test Sequence | T 70, T 250, T 500, T 2000, H₂O, T 40 | | | | | | | | | |
|   | Collection Time (hours) | 1 | 1 | 1 | 1 | 1 | 1 | | | | |
| 3 | Permeate Flow (ml/cm² . min)* | .096 | .044 | .035 | .020 | .014 | .006 | 11.5 | .087 | 2450 | 24 |
|   | Inlet Pressure (mm Hg) | 200 | 200 | 200 | 200 | 200 | 200 | | | | |
|   | % Clearance** | N/A | ND | ND | 87 | 97 | 70 | | | | |
|   | Test Sequence | H₂O, T 40, T 70, T 250, T 500, T 2000 | | | | | | | | | |
|   | Collection Time (hours) | 1 | 1 | 1 | 1 | 1 | 2 | | | | |
| 4 | Permeate Flow (ml/cm² . min)* | 0.52 | N/D | .027 | .015 | .0081 | .0037 | 33.8 | .24 | 3190 | 20 |

TABLE 4-continued

| Run No. | Test Type | Stock Solution Type | | | | | | Gurley (Sec) | Gurley Sec. per Micron of Fiber Wall Thickness | Tensile Strength (psi) | Elongation (%) |
| --- | --- | --- | --- | --- | --- | --- | --- | --- | --- | --- | --- |
| | | Water | T 40 | T 70 | T 250 | T 500 | T 2000 | | | | |
| | Inlet Pressure (mm Hg) | 200 | N/D | 200 | 200 | 200 | 200 | | | | |
| | % Clearance** | N/D | N/D | 96 | 93 | 90 | 78 | | | | |
| | Test Sequence | H₂O, T 70, T 250, T 500, T 2000 | | | | | | | | | |
| | Collection Time (hours) | 2 | N/D | 1 | 1 | 1 | 2.25 | | | | |

*Flow = average flow of permeate through fiber wall during collection time.
**% Clearance = $\frac{\text{Concentration of dextran in permeate (gm/l)}}{\text{Concentration of dextran in stock solution (gm/l)}} \times 100$
N/D = Not determined

EXAMPLE 2

Example 1 is repeated to prepare several sets of hollow precursor fibers using the conditions shown at Table 5, runs 1 to 6. The resulting precursor fibers whose birefringence and dimensions are shown in Table 5 are pre-soaked at constant length for 1 minute at 90° C. in perchloroethylene and solvent stretched in perchloroethylene in accordance with Example 1 at a 300% total degree of stretch, a strain rate of 30%/min., and a solvent stretch temperature of 90° C. The resulting microporous hollow fibers from each run are then post-soaked for 1 minute in perchloroethylene at 90° C. at constant length, and then heat set for 3 minutes at 100° C. in a hot air oven. The air Gurley is then determined on each run and converted to Gurley seconds per micron of fiber wall thickness for ease of comparison of the data for each run. As can be seen from data of Table 5, the Gurley per micron of fiber wall thickness is increased substantially as the birefringence of the fiber is increased indicating a reduction in permeability of the hollow fibers. In certain instances a low permeability may be desired. This data illustrates that control of the birefringence of the precursor hollow fibers is critical to achieving a particular permeability when the precursor fiber is solvent stretched under any given set of solvent stretching conditions as described herein.

rolls. The surface speed of each set of skewed rolls is controlled to incrementally stretch the immersed hollow precursor fibers. The total degree of stretch imparted to the hollow fibers is varied from 200 to 300% as shown at Table 6. The strain rate is also raised during each run as shown at Table 6.

As may be seen from Table 6 the hollow fibers of runs 6 to 9 which have birefringences of 0.00022 and 0.00030 that are outside the scope of the present invention break due to the lack of sufficient mechanical strength, and could not be processed on a continuous basis. In contrast, the hollow fibers of runs 1 to 5 which have birefringences of 0.00150 and 0.00180 which are within the scope of the present invention did not break and were readily solvent stretched.

This Example illustrates the effect of controlling the birefringence of the hollow precursor fibers on the mechanical properties and processability thereof in a continuous solvent stretching process.

TABLE 6

| Run No. | Precursor Hollow Fiber Birefringence | Total Degree Of Stretch (%) | Strain Rate (%/min) | Observations |
| --- | --- | --- | --- | --- |
| 1 | .00150 | 200% | 25-100 | OK |
| 2 | .00150 | 250 | 30-125 | OK |
| 3 | .00150 | 300 | 40-150 | OK |
| 4 | .00180 | 200 | 25-100 | OK |
| 5 | .00180 | 250 | 30-125 | OK |
| 6 | .00022 | 200 | 25-100 | Breaks |
| 7 | .00022 | 250 | 30-125 | Breaks |
| 8 | .00030 | 200 | 25-100 | Breaks |
| 9 | .00030 | 250 | 30-125 | Breaks |

OK = Fibers do not break

TABLE 5

| Run No. | Extrusion Temp. (°C.) | Extrusion Rate (gm/min) | Take-up Speed (m/min) | Drawdown Ratio | Precursor Fiber O.D. | Precursor Fiber I.D. | Precursor Birefringence | Solvent Stretched Microporous Hollow Fiber W.T. (μ) | Gurley (Sec.) | Air Gurley Sec. Per Micron of W.T. |
| --- | --- | --- | --- | --- | --- | --- | --- | --- | --- | --- |
| 1 | 250 | 10.5 | 140 | 155 | 115 | 67 | .00106 | 23 | 18 | 0.8 |
| 2 | 250 | 22.2 | 140 | 35 | 257 | 167 | .00125 | 30 | 22 | 0.7 |
| 3 | 250 | 16.2 | 140 | 66 | 186 | 118 | .00181 | 26 | 46 | 1.8 |
| 4 | 185 | 10.5 | 170 | 104 | 131 | 64 | .00183 | 37 | 119 | 3.2 |
| 5 | 185 | 9.0 | 170 | 142 | 111 | 53 | .00200 | 29 | 243 | 8.4 |
| 6 | 220 | 5.1 | 170 | 163 | 120 | 78 | .00517 | 15 | 246 | 16.4 |

O.D. = Outer diameter in microns
I.D. = Inner diameter in microns
W.T = Wall thickness in microns

EXAMPLE 3

Several sets of hollow fiber precursor samples are prepared in accordance with Example 1 at processing conditions controlled to impart a birefringence thereto as shown in Table 6. The resulting precursor hollow fibers are pre-soaked and annealed in accordance with Example 1 and solvent stretched on a continuous basis in the following manner. The precursor hollow fibers obtained from each run are passed through a bath of perchloroethylene using a series of stress isolation devices which take the form of several pairs of skewed The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A process for preparing hollow open-celled microporous fibers which comprises:
    (a) providing from at least one polyolefin having both an amorphous component and a crystalline component, solidified polymeric non-porous hollow precursor fibers with a degree of molecular orientation characterized by a birefringence of from about 0.0008 to about 0.005;
    (b) contacting said hollow precursor fibers with a swelling agent, said swelling agent comprising a non-aqueous solvent having a Hildebrand solubility parameter at or near that of the polymeric hollow precursor fibers, for a time sufficient to permit absorption of the swelling agent into the hollow fibers;
    (c) stretching said hollow precursor fibers while in contact with the swelling agent, which is maintained at a temperature greater than the glass transition temperature of the precursor fibers and the freezing point of the swelling agent and less than the temperature at which the precursor fibers dissolve, at a degree of stretch of from about 150 to about 400% based on the initial precursor fiber length and a strain rate of from about 5 to about 150%/min.; and
    (d) removing the swelling agent from said hollow fibers while maintaining said hollow fibers in the stretched state.

2. The process in claim 1 wherein the polyolefin is a homopolymer which is melt spun to form the hollow precursor fibers, the birefringence of the precursor fibers is controlled to be from about 0.0008 to about 0.005, the swelling agent is selected from the group consisting of trichloroethylene, and perchloroethylene, the degree of stretch is from about 200 to about 300%, the strain rate is from about 10 to about 50%/min, and the solvent stretch temperature is from about 25 to about 90° C.

3. The process of claim 2 wherein stretching of the hollow precursor fibers is conducted on a continuous basis.

4. The process of claim 2 wherein the polyolefin homopolymer is polyethylene having a melt index of from about 3 to about 20, a molecular weight distribution ratio of from about 3.8 to about 13, a density of from about 0.962 to about 0.965 gm/cc., and the birefringence of the hollow precursor fibers is controlled to be from about 0.001 to about 0.003.

5. The process of any one of claims 1 to 4 wherein the hollow precursor fibers are annealed prior to stretching at a temperature of from about 90° to about 120° C. at substantially constant length for a period of about 1 to about 30 minutes, soaked in the swelling agent at the solvent stretch temperature for a period of about 10 seconds to about 10 minutes at substantially constant length prior to stretching, and the resulting microporous hollow fibers heat set after stretching at a temperature of from about 85° to about 120° C. for a period of about 0.1 second to about 1 hour in a manner sufficient to prevent a change in the length of the microporous fibers of greater than about 5% based on the length of the microporous fibers prior to heat setting.

* * * * *